United States Patent
Crooks et al.

(10) Patent No.: US 6,312,809 B1
(45) Date of Patent: *Nov. 6, 2001

(54) DENDRIMER MONOLAYER FILMS

(75) Inventors: Richard M. Crooks, College Station, TX (US); Antonio J. Ricco, Albuquerque, NM (US); Mona Wells, College Station, TX (US)

(73) Assignee: Sandia Corporation, Albuquerque, NM (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/639,049

(22) Filed: Apr. 24, 1996

(51) Int. Cl.⁷ .............................. B32B 9/04; B32B 15/04; B32B 27/30; B32B 9/00
(52) U.S. Cl. ................... 428/411.1; 428/457; 428/500; 428/688
(58) Field of Search .................. 428/411.1, 457, 428/500, 688; 424/486, DIG. 16; 427/385.5, 399

(56) References Cited

U.S. PATENT DOCUMENTS

| | | | |
|---|---|---|---|
| 3,669,939 | * 6/1972 | Baker et al. | 260/78 A |
| 4,507,466 | * 3/1985 | Tomalia et al. | 528/332 |
| 5,171,264 | * 12/1992 | Merrill | 623/3 |
| 5,470,307 | * 11/1995 | Lindall | 604/20 |
| 5,558,968 | * 9/1996 | Russell et al. | 430/109 |
| 5,723,219 | * 3/1998 | Kolluri et al. | 428/411.1 |

OTHER PUBLICATIONS

Dagani, "Chemists Explore Potential of Dendritic Macromolecules as Functional Materials," C&EN, pp. 30–38, Jun. 1996.

Tomalia, "Dendrimer Molecules," Scientific American, pp. 62–66, May 1995.

Tomalia et al., "Dendrons, dendrimers and dendrigrafts," Chemistry & Industry, pp. 416–420, Jun. 1997.

Kim et al., Polymeric Self–Assembling Monolayers Tet. Leeett. 1, Dec. 9, 1994. vol. 35, No. 51, p. 9501–9504.

Duevel et al., "Amide and Ester Surface Attachment Reactions for Alkanethiol Monolayers at Gold Surfaces as Studied by Polariziation Modulation FTIR", Anal. Chem. Feb. 1992 vol. 64, p. 337–342.

Kim et al., "Polymeric Self–Assembled Monolayers", J. Am. Chem. Soc. Apr. 1995 vol. 117, p 3963–3967.

Rubin et al., "Dendrimer Modified Silicon Oxide Surfaces as Platforms for the Deposition of Gold and Silver Colloid Monolayers: Preparation Method, Characterization, and Correlation between Microstructure and Optical Properties", Langmuir, 1996, 12, 1172.*

Tomalia et al., "Comb–Burst Dendrimer Topology. New Macromolecular Architecture Derived from Dendritic Grafting", Macromolecules, 24, 1435–1438, 1991.*

Merrill et al., "Transformation of Polymer Surfaces by Covalent Grafting of Poly(ethylene oxide) star Molecules for Biomedical Applications", MIT Chemical Engineering Publication, 1995.*

* cited by examiner

Primary Examiner—Paul Thibodeau
Assistant Examiner—Holly C. Rickman
(74) Attorney, Agent, or Firm—Brian W. Dodson; Timothy D. Stanley

(57) ABSTRACT

A substrate having a dendrimer monolayer film thereon is provided. The film can comprise either dendrimers, or dendrons (dendrimer branches). In each case, the monolayer films are covalently bonded to the desired surface. The resulting structure can be employed in a variety of applications including chemical sensors.

10 Claims, 5 Drawing Sheets

DENDRIMER MONOLAYER FILMS

FIELD OF THE INVENTION

The present invention relates to a substrate having a dendrimer film thereon, and in particular, a dendrimer monolayer film that is covalently bonded to the surface. This film can be used, for example, as a chemically sensitive surface.

BACKGROUND OF THE INVENTION

Dendrimers are three dimensional manmade molecules which, as illustrated in FIG. 1, have a three-dimensional, spherical or ball shape.

Dendrimer macromolecules are generally produced in one of two ways. See, for example, "Preparation of Polymers with Controlled Molecular Architecture. A New Convergent Approach to Dendritic Macromolecules," Hawker et al., J. Am Chem. Soc., 1990, 112, pp 7638–7747, which is incorporated herein by reference. The first of these methods is called the "divergent" approach. This method relates to the outward growth of the dendrimers from the center core in producing macromolecules. A second method for producing dendrimers is a convergent approach. In the convergent method, individual branches which make up the dendrimer are produced and these branches are then connected together to form the resulting dendrimer.

Dendrimers have generated a great deal of excitement largely due to their hollow, three-dimensional ball-like shape. It has been proposed to employ material "inside" the dendrimers which would allow the resulting material to be used in a variety of applications such as genetic therapy, drug delivery and even computer chips. For example, such "balls" can carry genetic materials into cells to repair birth defects. Alternatively, dendrimers can act as a delivery system for drugs.

It has further been proposed that dendrimers could be introduced onto a surface of a substrate. However, the art has not been able to successfully bond, and in particular, covalently bond, dendrimers onto the surface of substrates.

It is the belief of the inventors that the inability to effectively bond dendrimers to surfaces is a significant factor in preventing the practical use of dendrimers. For example, while as chemical sensors, has been mentioned, a practical way of employing dendrimers has not been found.

SUMMARY OF THE INVENTION

By the present invention, a substrate having a monolayer comprising dendrimers or dendrimer branches (also known as dendrons) has been provided.

In one aspect of this invention, the substrate has reactive functional groups secured thereto and at least one dendrimer monolayer is covalently bonded to the surface through the reactive functional groups.

In another aspect of this invention, the monolayer film comprises dendrimer branches or dendrons which are "grown" from the substrate is provided. As was the case with the first embodiment, the monolayer is covalently bonded to the substrate by way of the reactive functional groups.

The dendrimer monolayers of the present invention can be employed in a variety of applications including chemical sensing.

DETAILED DESCRIPTION OF THE PREFERRED EMBODIMENTS

Figure 1:
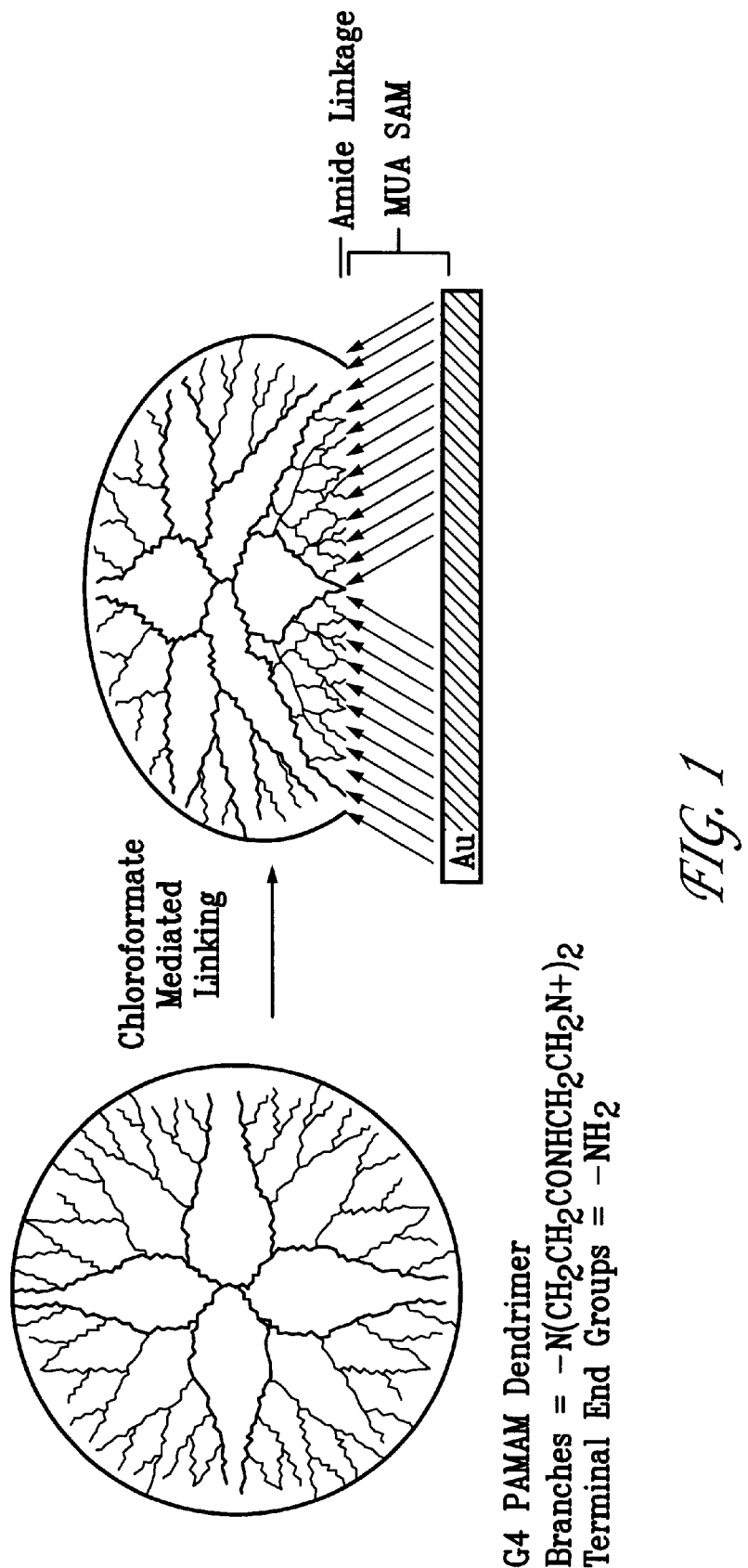
FIG. 1 illustrates a synthesis method for producing the dendrimer monolayer film of the present invention.

Although the present invention will largely be discussed in terms of the use of dendrimers in providing the desired monolayer film, the following discussion is equally applicable to both the use of dendrimers or dendrons in providing the monolayer(s). Moreover, the term "dendrimer monolayer film" includes both of these embodiments.

The dendrimer monolayer films of the invention can be introduced onto any of a variety of substrates. Suitable substrates can include insulators, conductors, or semiconductors. Moreover, the substrates can comprise metals or nonmetals from the periodic table, polymers, and the like. Specific examples of suitable substrates include gold, aluminum, aluminum oxide, gallium-arsenide, copper, silver and poly(acrylic acid).

The only requirement is that the substrate have reactive functional groups secured thereto. Such reactive functional groups are selected so as to be reactive with a corresponding group of the dendrimer or dendron. For example, where a dendrimer is employed, the corresponding groups are the terminal end groups on the outside of the dendrimer. On the other hand, where the monolayer comprises dendrons, the corresponding group is the "base group" of the branch.

As a specific example, where a dendrimer having amino groups as the terminal end groups, suitable reactive functional groups for the substrate include carboxylic groups, hydroxy groups, and epoxy groups with carboxylic groups being preferred. However, any combination of groups suitable for reacting so as to covalently bond the monolayer onto the surface of a substrate can be employed.

The reactive functional groups can be introduced onto the substrate by any known method. In one preferred embodiment of the invention, a self-assembled monolayer including the reactive functional groups (or precursor thereof) is introduced onto the substrate and the dendrimer or dendrimer branches are covalently bonded thereto.

Self-assembled monolayers are known in the art. See, for example, DuBois et al., Annu. Rev. Phys. Chem., 1992, 43, p. 437 et seq. which is incorporated herein by reference. In short, self-assembled monolayers relate to a monolayer film which is comprised of molecules that attach themselves to a substrate and align themselves parallel to each other with each molecule extending from the substrate. Such molecules are capable of forming well-ordered monolayers on a variety of surfaces.

Recently, one class of SAM that has received considerable attention are organomercaptans and in particular, ω-functionalized n-alkanethiols. These compounds preferably have from 4–40 carbon atoms, more preferably 10–20, and still more preferably about 11 carbon atoms.

While self-assembled monolayers produced from such compounds can be employed in this invention, it is equally applicable to the wide variety of SAMs in use today. For example, both unpolymerized and polymerized SAMs can be use. Polymerized SAMs are discussed in Kim et al. "Polymeric Self-Assembling Monolayer. 1. Synthesis and Characterization of ω-Functionalized N-Alkanethiol Containing a Conjugated Diacetylene Group" Tetrahedron Letters, Vol. , No. 51, pp. 9501–9504, 1994; Kim et al., "Polymeric Self-Assembling Monolayer. 2. Synthesis and Characterization of Self-Assembled Polydiacetylene Mono- and Multilayers.", J. Am. Chem. Soc., 1995, 117, pp. 3963–3967; and Batchelder et al., "Self-Assembled Monolayer containing Polydiacetylenes", J. Am. Chem. Sc., 1994, 116, pp. 1050–1053 and copending U.S. application Ser. No. 08/631,213 filed Apr. 12, 1996 now U.S. Pat. No. 5,885,735, each of which are incorporated herein by reference in their entirety.

Where self-assembled monolayers are employed, the primary requirement is that they include reactive functional groups on the surface thereof. The functional groups associated with the SAMs are subject to the same requirements as those discussed above, i.e., capable of reacting with the terminal end groups of a dendrimer or a starting group of a dendrimer branch, so as to covalently bond the dendrimer monolayer onto a surface of a substrate.

Of course, where the surface groups of the substrate and/or the SAMs is not reacted with the dendrimer end groups, suitable modification of the surface groups into reactive functional groups should be employed.

That is, reactive functional groups can be introduced in producing the molecules used in making the SAMs or, the surface of the SAMs can be modified subsequent to bonding onto the substrates. Techniques for modifying the surface of SAMs recognized in the art. See, for example, Duevel et al, R. M. Anal. Chem., 1992, 4, p. 337; and the previously cited Kim et al article from J. Am. Chem. Soc., 1995, 117, which are incorporated by reference.

The monolayer of the present invention can be formed either of two ways. First, preformed dendrimers can be covalently bonded to the reactive functional groups in a manner such as that illustrated by FIG. 1.

In this technique, any dendrimer having suitably reactive endgroups can be introduced onto the surface. Dendrimers for use in this embodiment can be produced, for example, by either the divergent or convergent methods for forming the dendrimers. One specific example of a suitable dendrimer which has received recent attention is poly(amidoamine) (PAMAM) dendrimer. Other suitable dendrimers are discussed in the Hawker et al. article discussed above.

In looking at dendrimers, the size of the dendrimer is not critical, i.e., dendrimers of any generation can be employed in this invention. Specific examples include PAMAM dendrimers of generations G0–G8.

Further, suitable dendrimers can be commercially obtained from, for example, Dendritech Inc.

The dendrimer can be covalently bonded onto the surface of the substrate through the reaction of the terminal end groups of the dendrimer with the reactive functional groups. For example, where the terminal end groups are amino groups and the functional groups are carboxylic acid groups, suitable techniques such as chloroformate-mediated linking reaction can be employed.

Moreover, suitable mechanisms for reacting the reactive functional groups with dendrimer end groups would be recognized by those skilled in the art. Accordingly, other combinations of end groups/reactive functional groups can be effectively employed.

In a second embodiment, the dendrimer layer comprises a plurality of dendrimer branches or dendrons which are "grown" on the desired surface. The formation of the monolayer occurs according to either the divergent or convergent approach for forming dendrimers and results in the formation of a monolayer that comprises dendrons rather than the entire dendrimer macromolecule.

Figure 2:
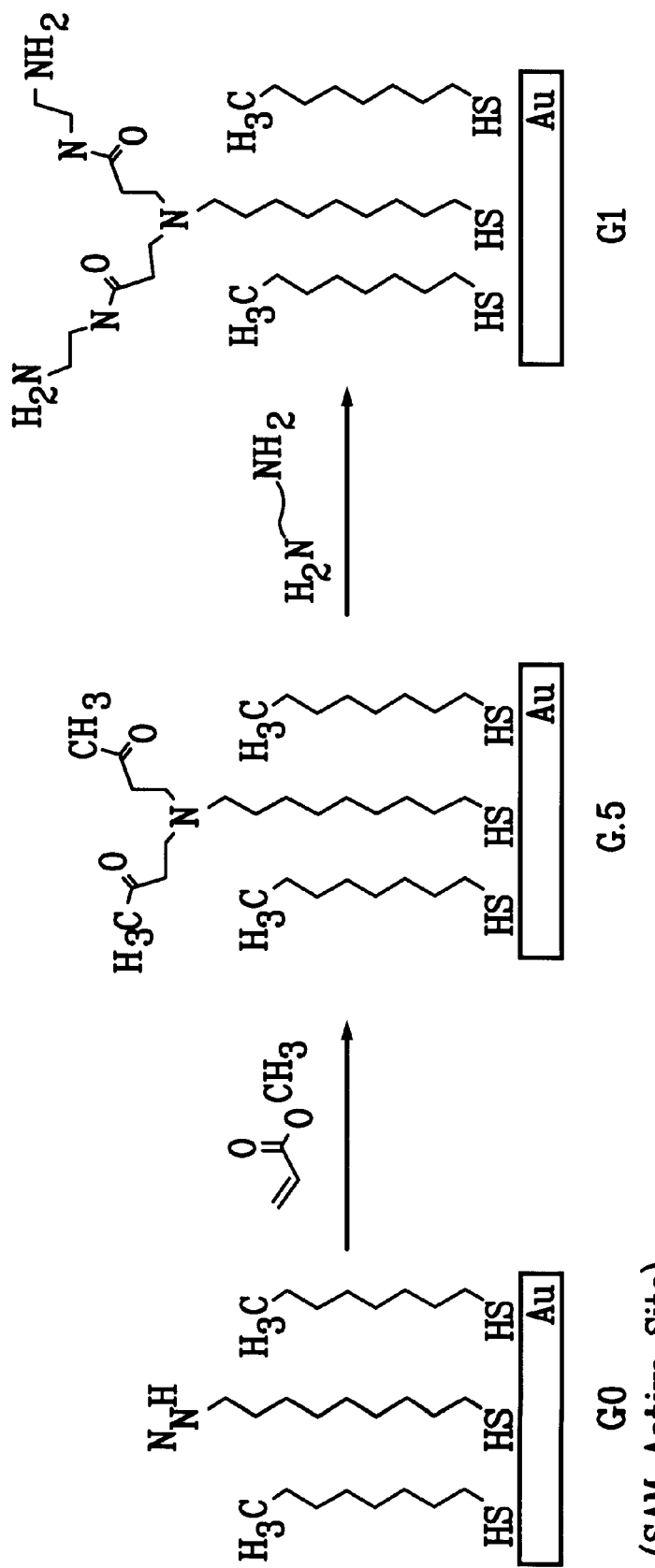
FIGS. 2–3 illustrate synthesis methods for producing a monolayer comprising dendrons.
Figure 3:
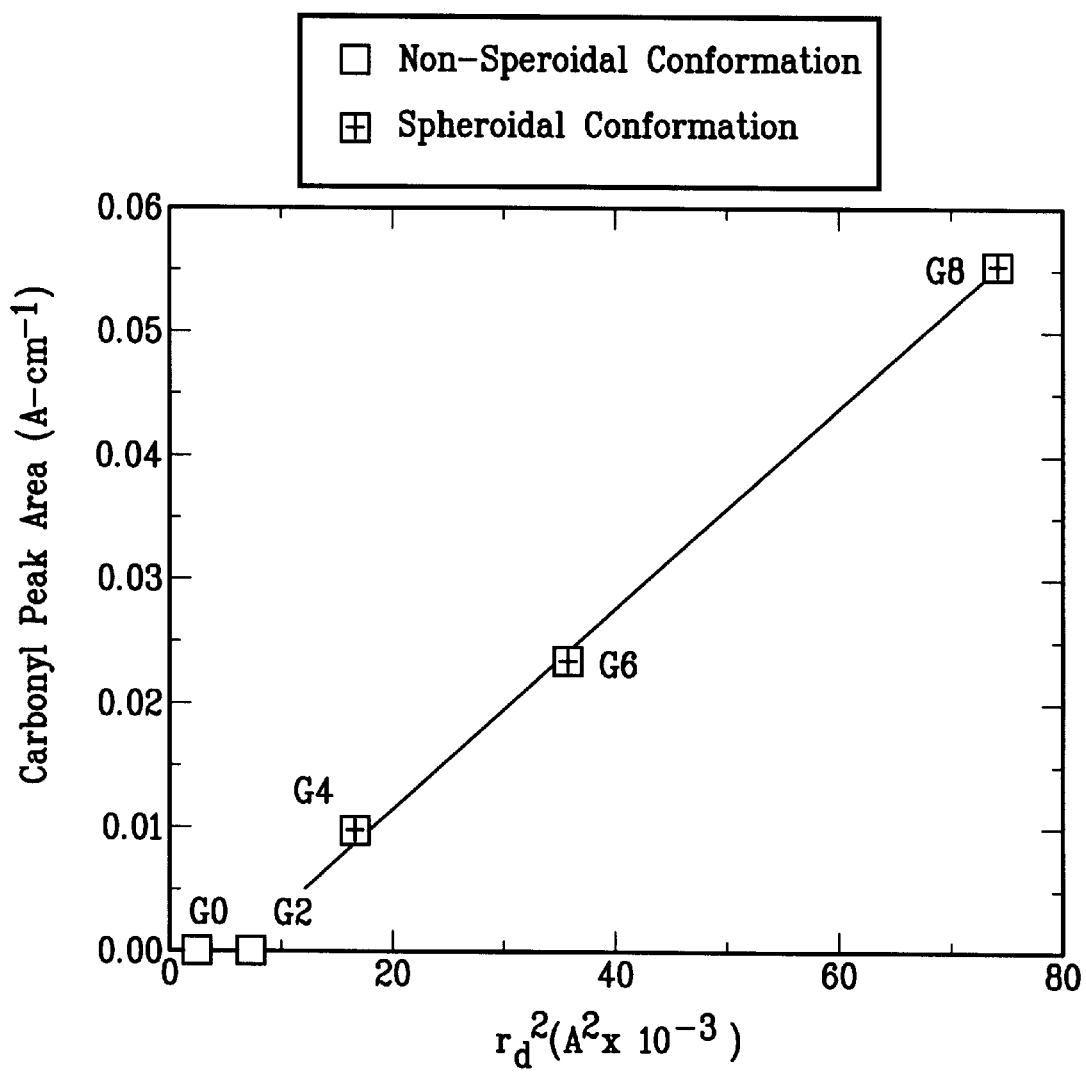

FIG. 2 illustrates a divergent technique for forming dendrons on the surface of a substrate while FIG. 3 illustrates the convergent approach. As can be seen, the divergent approach involves the addition of each generation in discrete steps, such that the dendron increases in incremental size like an onion. Examples of known techniques include both solution phase synthetic techniques and Merrifield solid-state synthetic techniques.

The convergent approach, on the other hand, involves the use of protection/deprotection schemes to synthesize dendrons which are subsequently joined to a central "core." This technique can involve, for example, of coupling of dendrons to active sites using a zero length heterobifunctional linking agent. The dendrons can include those from an outside source, e.g., inveigle dendrons, or can be produced by known techniques, e.g., bulk-phase techniques.

Irrespective of the technique employed, upon the formation of the monolayer, the outer surface of the monolayer has a relatively corrugated profile.

Further, and also irrespective of the technique employed, more than one dendrimer layer can be effectively introduced onto the substrate. The dendrimer layers can be bonded to each other as long as the innermost layer has end groups on the surface thereof which can react with the terminal end groups of the dendrimers to be deposited.

Dendrimer monolayer films according to the present invention represent a new type of interfacial architecture. For example, the voids within the dendrimer superstructure can serve as endoreceptors while the terminal functional groups of the dendrimers serve as exoreceptors. Because of this, the composite structures of the present invention can be readily employed in chemical sensing applications.

In fact, the monolayer films of the present invention provide the best of both worlds, i.e., the advantages of three-dimensional dendrimeric structure and increased practical applicability because such structures are covalently bonded to a substrate. That is, while the structures can be employed in any of the traditional applications for dendrimers, they can also be effectively employed in a variety of additional applications such as chemical sensing.

In this regard, the surface of the resulting dendrimer monolayer film can be altered so as to increase the utility of the invention. For example, as chemical sensors, the techniques for altering the surfaces of dendrimers in this regard or the same as those recognized in the art for altering the surfaces of nonconfined dendrimers. As such, they need not be described in detail here.

The present invention will now be described in the form of certain examples. However, these examples should be considered solely as illustrative of the present invention and, in no way, should limit the invention.

EXAMPLE 1

Figure 4:
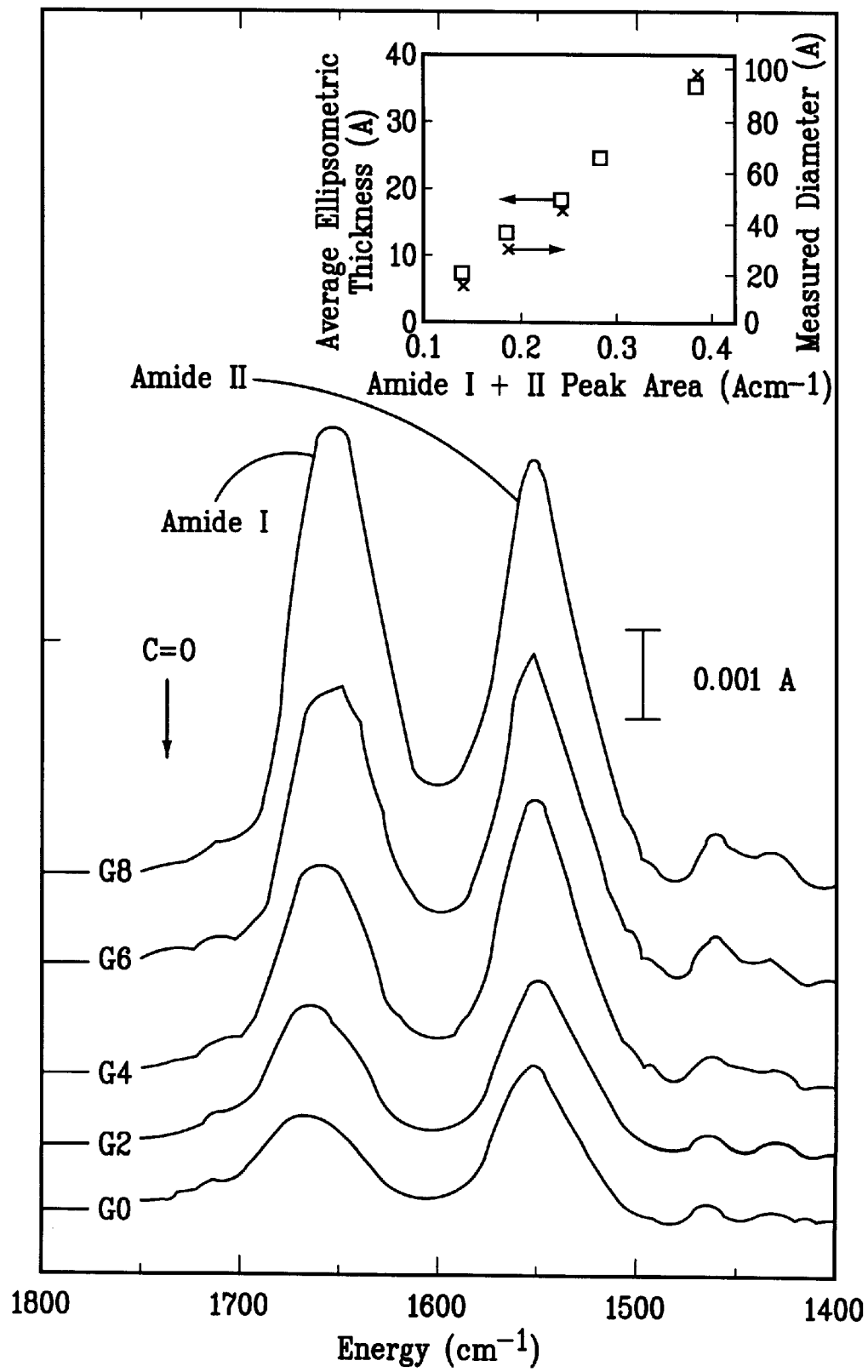
FIGS. 4, 5, 6a and 6b are graphical representations of data presented in the examples according to the present invention.

Poly(amidoamine) (PAMAM) dendrimers were linked to a mercaptoundecanoic acid (MUA) self-assembled monolayer (SAM) via amide bond formation by the method of FIG. 1. To confirm covalent attachment, we obtained FTIR-ERS spectra of surfaces modified with five different generations (sizes) of PANAM dendrimers (G0, G2, G4, G6, and G8). FIG. 4 shows the amide and carbonyl region of these spectra.

There are two important points. First, residual infrared absorbance from the MUA carbonyl groups after linking was not observed. This indicates complete or nearly complete reaction between all five dendrimers and the MUA surface. Second, the principal infrared-active functionality of PAMAM dendrimers are amides, and the total area of the amide I and II bands increases with increasing dendrimer generation. Further, the inset of FIG. 4 shows that both the dendrimer diameters and the measured ellipsometric thicknesses of the dendrimer monolayers scale linearly with the amide I and II peak area. Since the two-dimensional projection of the dendrimer monolayer onto the surface is the same for all five generations, these results demonstrate how the anticipated three-dimensional film structure scales with dendrimer size.

EXAMPLE 2

Because dendrimers of different size and chemical composition may prove suitable for integration into array-based chemical sensors, it is desirable to provide surfaces of varying chemical composition. To illustrate this, a methyl ester-terminated dendrimer using the Michael addition of methyl acrylate to the primary amine terminal groups of surface-confined dendrimers was prepared. Following conversion, the characteristic signature of the methyl ester in the carbonyl region of the infrared spectrum ($1720$–$1740 cm^{-1}$) was observed.

Figure 5:
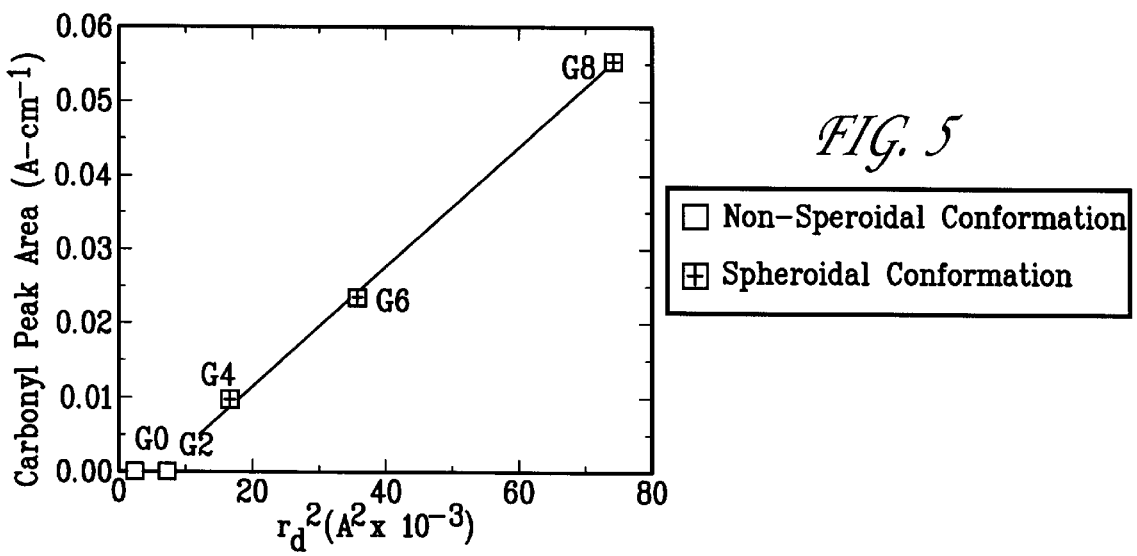

FIG. 5 illustrates the relationship between surface reactivity, gauged by the area of this carbonyl band, and the square of the dendrimer radius ($r_d^2$). The graph illustrates two important points. First, below the threshold at which PAMAM dendrimers adopt a globular geometry (G0 and G2), the dendrimer films show no reactivity because all or most of the outer functional groups react with the surface during attachment. Second, above the threshold at which PAMAM dendrimers adopt a globular geometry (G4–G8), the number of dendrimer film reactive sites increases linearly with $r_d^2$, indicating that methyl ester conversion is proportional to the surface area of the surface-confined dendrimer spheroids. This is consistent with the three-dimensional evolution of film structure.

EXAMPLE 3

Figure 6A:
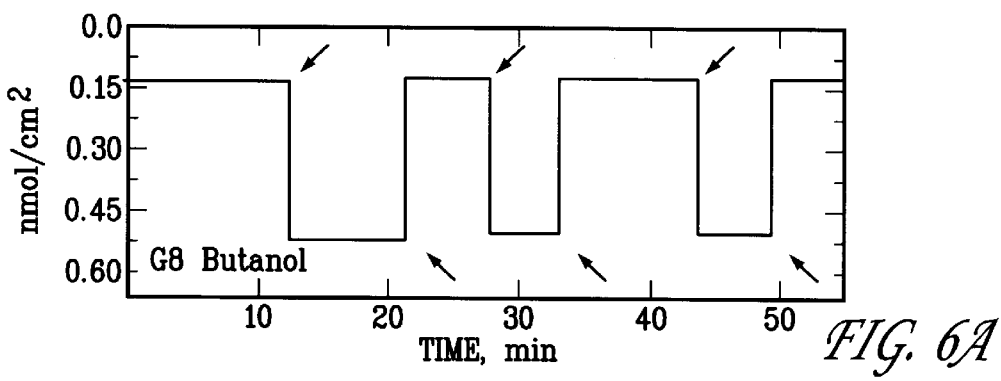

To determine the suitability of dendrimer surfaces as chemically sensitive interfaces, we sequentially dosed dendrimer-modified surface acoustic wave (SAW) mass balances with volatile organic compounds (VOCs) having different functional groups (FIG. 6). FIG. 6a is an example of unprocessed data from a typical SAW experiment. It illustrates how the dendrimer-modified device response possesses three of the essential attributes for an ideal chemical sensor: (1) the response to dosants is very rapid, and there is no detectable permeation transient, (2) the device signal-to-noise ratio is excellent, and (3) the response is typically completely reversible.

Figure 6B:
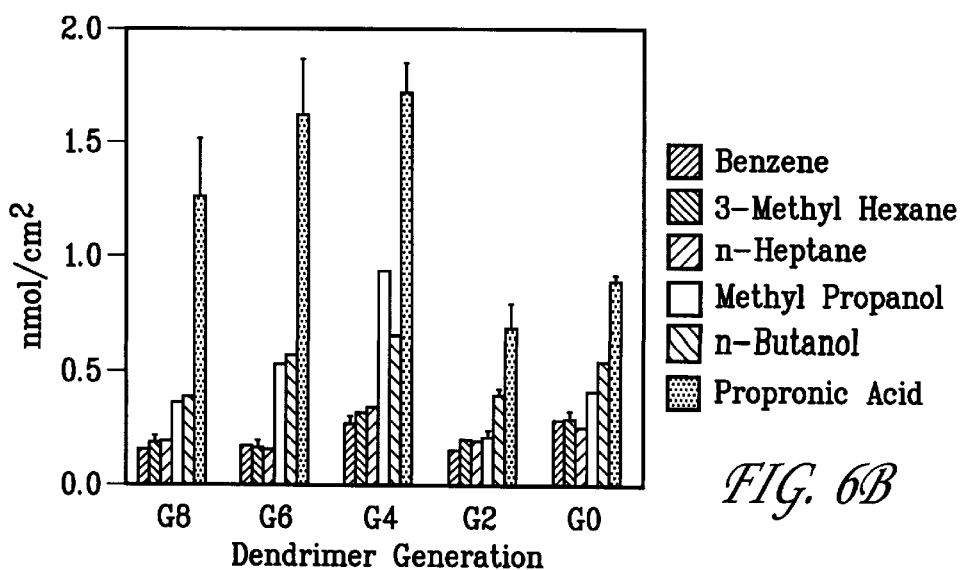

FIG. 6b summarizes the results from vapor-phase dosing of dendrimer-modified surfaces. The response to VOCs decreases in the order acid>alcohols>hydrophobic dosants. This response order is more pronounced for the G4–G8-modified surfaces and is dictated by the PAMAM structure which possesses hydrogen-bonding exoreceptors and endoreceptors. The G4-modified surface is the most responsive material probably because, although it is the smallest of the spheroidal dendrimers, its interior endoreceptors are most accessible. G0 and G2 dendrimer films are not as effective at discriminating between the three different classes of probes since these surfaces have few or no free amine terminal groups and no coherent endoreceptive ability.

Although the present invention is believed to be described in the terms of certain preferred embodiments, those skilled in the art would recognize that various modifications, omissions, substitutions and other changes can be made without departing from the spirit thereof. Accordingly, the scope of the invention should be determined by the scope of the following claims including equivalents thereof.

What is claimed is:

1. A composite structure, comprising:
    a) a substrate;
    b) a set of molecules, each such molecule being bound to the substrate and covalently bound to a starting group of one of a suite of dendrons; and,
    c) a suite of dendrons, each of said suite of dendrons comprising a starting group.

2. The composite structure of claim 1, wherein said substrate is metallic.

3. The composite structure of claim 1, wherein said substrate is inorganic.

4. The composite structure of claim 1, wherein each of the set of molecules is covalently bound to the substrate.

5. The composite structure of claim 1, wherein said set of molecules belongs to a self-assembled monolayer.

6. The composite substrate according to claim 5, wherein the self-assembled monolayer is produced from an organomercaptan.

7. The composite structure of claim 1, wherein each said molecule comprises carboxylic acid groups, hydroxyl groups, or epoxy groups.

8. A method for forming a dendron layer on a surface, comprising:
    a) coating said surface with a self-assembled monolayer of molecules;
    b) introducing dendrons with starting groups; and,
    c) forming covalent bonds between said starting groups and said molecules.

9. The method of claim 8, wherein coating said surface comprises forming covalent bonds between the self-assembled monolayer and the surface.

10. A chemical sensor, comprising a composite structure according to claim 1.

* * * * *

UNITED STATES PATENT AND TRADEMARK OFFICE
CERTIFICATE OF CORRECTION

PATENT NO. : 6,312,809 B1 Page 1 of 1
DATED : November 6, 2001
INVENTOR(S) : Richard M. Crooks et al.

It is certified that error appears in the above-identified patent and that said Letters Patent is hereby corrected as shown below:

<u>Title page,</u>
Item [73], change "Sandia Corporation, Albuquerque, NM (US)" to
-- Sandia Corporation, Albuquerque, NM (US) and The Texas A&M University System, College Station, TX (US) --

<u>Column 1,</u>
Line 2, add:
       -- GOVERNMENT RIGHTS
   This invention was made with Government support under Contract No. DE-AC04-94AL85000 awarded by the U.S. Department of Energy. The Government has certain rights in the invention. --

Signed and Sealed this

Fifth Day of August, 2003

JAMES E. ROGAN
*Director of the United States Patent and Trademark Office*